Patented Dec. 17, 1940

2,224,874

UNITED STATES PATENT OFFICE 2,224,874

MANUFACTURE OF SHAPED STRUCTURES AND OTHER USEFUL ARTICLES FROM CELLULOSE DERIVATIVES

Leon Lilienfeld, Vienna, Austria; Antonie Lilienfeld, special administratrix of said Leon Lilienfeld, deceased No Drawing. Application September 4, 1937, Serial No. 162,520. In Great Britain September 11, 1936

9 Claims. (Cl. 18—54)

The addition of some organic substances, particularly of glucose or glycerine, to coagulating baths containing at least one alkali carbonate, e. g. $Na_2CO_3$ solution of 5 to 36% strength or $NaHCO_3$ solution of 3 to 14% (sodium being here mentioned as typical of the alkali metals) as the essential coagulating agent for viscose or for a solution of a xanthate of another cellulosic body (such as xanthates of ethers of cellulosic bodies), or for solutions of alkali-soluble ethers or esters of cellulosic bodies; or the addition of glucose or glycerine to solutions of other alkaline salts (e. g. borax, sodium silicate, trisodium phosphate, sodium acetate, etc.) used for that purpose is shown and claimed in my copending cases 79,199 and 90,818 to 90,821, inclusive. Such an addition has in some cases a favourable effect on the production of shaped structures or other useful articles (e. g. on the spinning operation) from alkalisoluble cellulose derivatives and/or on the properties of the shaped structures or other useful articles thus prepared, for example, according to the processes laid down in the specifications set out above.

On the other hand, they (glucose and glycerine) have the disadvantage of discolouring and, thus, contaminating the coagulating baths which sometimes impart this discolouration to the shaped structures, so that, in such cases, the regenerated structures require a more thorough purification by a special after-treatment or by prolonged washing or the like.

The present process is based on my discovery that these drawbacks can be avoided by using as organic substances to be added to the baths containing at least one alkali carbonate, such pentosans or glucosans (polysaccharides) as are at least partially soluble in alkali carbonate solutions. Since, in many cases the coagulating baths containing at least one alkali carbonate are kept at an elevated temperature, in such cases it is sufficient that the pentosan or glucosan or pentosans or glucosans in question are soluble in alkali carbonate solutions at the temperature of the coagulating bath, for example at 45 or 50 or 60 or 70° C.

But the invention is marked by another very important technical advance which consists in the following:

Particularly when they contain a large proportion of alkali carbonate (for example 20 to 28 per cent. of $Na_2CO_3$) the coagulating baths, for example the coagulating baths mentioned in the first paragraph, have frequently a tendency towards crystallising even when they contain glucose; so much so, that, to prevent the crystals from injuring the shaped structures, such as artificial threads or film, during their production, in some cases it is advisable to take special measures, for example to trickle water over the shaped structures on their way from the coagulating bath to the collecting device.

Now, it is possible, in many cases, to suppress or at least to reduce the tendency toward crystallization of these carbonates by incorporating with the coagulating baths containing at least one alkali carbonate, one or more pentosans or glucosans which are at least partially soluble in alkali carbonate solutions.

The carrying out of the present process in practice is very simple. It consists in incorporating with a liquid containing at least one alkali carbonate, at least one pentosan or glucosan or a material containing at least one pentosan or glucosan and thereafter using the thus obtained product as a coagulating medium for a shaped solution containing at least one alkali-soluble cellulose derivative or compound.

The penosans or glucosans may be used in the present invention by themselves, i. e. in the isolated form or together with some accompanying substances which are present in the extracts of the materials in which they are contained and from which they can be prepared. The latter modification of the present process may be used, for example, in the case of extracts of straw or beechwood which are termed "wood gum" and which extracts contain i. a. xylan, or in the case of extracts of seeds or fruit (for example of the shells of rye or wheat bran) which extracts contain i. a. araban. In other words: the pentosans or glucosans can be used either per se or in the form of extracts of the materials in which they occur.

The alkali carbonate solutions to which at least one pentosan or glucosan or the extracts containing them are added, may contain, or may be free from, any other organic substances, such as glucose or glycerine and/or one or more inorganic substances, such as a salt or the like.

In order to explain the nature of the present invention, the following specific examples are set forth. As stated above, the invention is not limited to these examples; the parts are by weight:

Example I 4500 parts of chopped rye-straw are dried at 80 to 100° C. to constant weight and then stirred with 23,332 parts of sodium carbonate solution of 28 percent. strength at 50° C., whereupon the mixture of the chopped straw with the alkali carbonate solution is heated under reflux cooling or in a closed vessel, for example, an autoclave, to 100 to 105° C., and kept at that temperature for 3 hours with continuous stirring or agitating. After that time the mother liquor is separated from the extracted chopped straw by straining or filtering or pressing or decanting or the like. The thus obtained extract is, if desired after having been filtered, used as coagulating bath for making shaped structures and other useful articles by introducing viscose thereinto, through an opening or openings of suitable size and shape, e. g. through a spinarette, as is commonly used for making artificial threads. Or a thin sheet of the viscose can be likewise introduced into said bath. Instead of viscose an alkaline solution of another xanthate of a cellulosic body can be similarly introduced. The coagulating bath can be at a temperature between about 5° C. and the boiling point, e. g. at 8–10° C., or at 35–40° C., or at 60° C. or at 90° C. It may be at room temperature.

*Example II*

7800 parts of chopped rye-straw are dried at 80 to 100° C. to constant weight and then stirred with 54,400 parts of sodium carbonate solution of 28 per cent. strength at 70° C., whereupon the mixture of the chopped straw with the alkali carbonate solution is heated under reflux cooling or in a closed vessel, for example an autoclave, to 100 to 105° C., and kept at that temperature for 6 hours with continuous stirring or agitating. After that time, the mother liquor is separated from the extracted chopped straw by straining or filtering or pressing or decanting or the like and used as described in Example I.

*Example III*

4000 parts of comminuted chips or shreds of beechwood are extracted with caustic soda solution of 5 per cent. strength at room temperature for 48 hours with continuous or intermittent stirring. The alkaline mother liquor is now separated from the extracted chips or shreds by pressing or straining or filtering or decanting or the like, and then, after having been filtered, precipitated by means of an equal quantity of alcohol of 95 per cent. strength. After it has settled down and after the supernatant alcohol has been decanted, the precipitate is collected on a straining cloth or in a centrifuge and thereafter gently pressed and washed with alcohol. Thereupon it is suspended in alcohol and hydrochloric acid is added until the reaction turns acid, whereafter the precipitate is separated from the mother liquor, washed with alcohol until free from acid and, if desired after exhaustion with ether, dried in vacuo at room temperature.

1000 or 3000 parts of the thus obtained powder are dissolved in 19,000 to 17,000 parts of a liquid containing sodium carbonate, for example a solution containing 36% or 32% or 28% or 21% or 15% or 10% of $Na_2CO_3$ at room temperature or at a higher temperature e. g. 45–50 or 60 or 70 or 80 or 90° C. This solution (setting bath) may also contain 10, 12, 13.5, 15, 16 or 18% of $Na_2SO_4$, or may contain borax, e. g. 8% or 23%, or sodium sulphite e. g. 8% or 17% or sodium bicarbonate 8% or 12% or mixtures or several of such substances.

Into one or another of the above setting baths, viscose or an alkaline solution of another xanthate of a cellulosic body (e. g. a solution of a xanthate of an ether of cellulose of a low degree of etherification) is introduced by means of a spinerette, and the thread formed is drawn off to a bobbin or into the pot of a centrifugal spinning machine. The spinning may be conducted with or without additional strength.

The threads can be desulphurized, if desired or necessary, soured, purified, washed, etc. all in a manner well known in the art.

Films may be made in an analogous manner.

*Example IV*

1000 parts of starch are dissolved in 19,000 parts of a liquid containing sodium carbonate, for example in any one of the baths set out in Example III above, and the said setting bath used as given in that example.

In the above examples, viscose has been mentioned. The viscose may be made with a small percentage of $CS_2$ (based on the cellulose), e. g. 10% or 15% or 20%, i. e. much less than ordinarily used. Or the normal content of $CS_2$ may be employed.

In place of viscose, solutions of alkali-soluble water-insoluble ethers or esters of cellulose or of another cellulosic body, can be used, dissolved in dilute caustic alkali solution, e. g. a solution containing 6–8% of a cellulose ether in a 6–10% NaOH solution.

The processes and methods of making shaped structures from alkali-soluble xanthated cellulose derivatives by means of coagulating baths containing at least one alkali carbonate (normal carbonate or bicarbonate) is claimed in my copending cases mentioned above, and explained therein by means of numerous examples. It therefore appears superfluous to repeat here all particulars relating to the preparation of the alkali-soluble cellulose derivatives or of their xanthates and to the working up of the solutions of the alkali-soluble cellulose derivatives or of their xanthates into shaped structures and other useful articles by means of coagulating baths containing at least one alkali carbonate and under various working conditions and to give here examples demonstrating all possible modifications of working the present invention.

Also the various definitions given in the aforementioned specifications after the examples hold good with the present invention also.

What I claim is:

1. A process of producing artificial regenerated cellulosic structures which comprises the step of contacting a solution containing a dissolved cellulose derivative dissolved in caustic alkali solution, while said solution has the shape of the artificial structure desired, with a solution of a carbonate of an alkali metal as the essential coagulating agent, such latter solution also containing a dissolved substance selected from the group consisting of pentosans and glucosans, and which latter solution is free from ammonium sulphate.

2. In the production of shaped artificial structures from viscose, the step of introducing viscose, while the same has the shape of the artificial structure to be produced, into an alkali carbonate solution which contains in solution a substance selected from the group consisting of pentosans and glucosans, said alkali carbonate solution being free from ammonium salts of strong mineral acids.

3. In the manufacture of shaped artificial cellulosic structures, the herein described process which comprises introducing a shaped solution of a xanthate of a cellulosic body into a setting bath which contains an alkaline salt of an alkali metal as its essential coagulating agent, such bath also containing in solution a substance selected from the group consisting of pentosans and glucosans, said bath being free from ammonium salts of strong mineral acids.

4. In the manufacture of shaped artificial cellulosic structures, the herein described process which comprises introducing a shaped solution of a xanthate of a cellulosic body into a setting bath which is a concentrated solution of a carbonate of an alkali metal as its essential coagulating agent, such bath also containing in solution a substance selected from the group consisting of pentosans and glucosans, said setting bath being free from ammonium salts of strong mineral acids.

5. A process as in claim 4, in which the setting bath is kept at not below 60° C.

6. A process as in claim 2, in which the alkali carbonate solution contains a dissolved xylan.

7. A process as in claim 2, in which the alkali carbonate solution contains an alkaline extract from straw.

8. A process of producing regenerated artificial cellulosic structures which comprises the step of contacting a solution containing a dissolved xanthate of a cellulosic body while such solution has the shape of an artificial structure to be produced, with a solution of a carbonate of an alkali as the essential coagulating agent, such latter solution containing a dissolved substance selected from the group consisting of pentosans and glucosans, and such latter solution being substantially free from ammonium salts of strong mineral acids.

9. A process as in claim 1, in which the substance selected from the group consisting of pentosans and glucosans is added in the form of a vegetable extract containing said substance in solution.

LEON LILIENFELD.